United States Patent
Sakamoto et al.

(10) Patent No.: US 6,731,589 B2
(45) Date of Patent: May 4, 2004

(54) SUBSTRATE FOR OPTICAL RECORDING MEDIA, OPTICAL RECORDING MEDIUM, MANUFACTURING PROCESS FOR OPTICAL RECORDING MEDIA, AND OPTICAL RECORDING/REPRODUCING METHOD

(75) Inventors: Tetsuhiro Sakamoto, Tokyo (JP); Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 09/747,721

(22) Filed: Dec. 22, 2000

(65) Prior Publication Data

US 2001/0030937 A1 Oct. 18, 2001

(30) Foreign Application Priority Data

Dec. 24, 1999 (JP) .......................................... P11-367464

(51) Int. Cl.[7] .............................. G11B 7/00; G11B 7/24; G11B 7/26
(52) U.S. Cl. ..................................... 369/275.4; 369/277
(58) Field of Search .............................. 369/277, 275.4, 369/275.1, 275.3; 428/64, 65

(56) References Cited

U.S. PATENT DOCUMENTS

| | | | | |
|---|---|---|---|---|
| 4,931,336 A | * | 6/1990 | Haneda | 369/277 |
| 5,216,665 A | * | 6/1993 | Imataki | 369/275.4 |
| 5,339,304 A | * | 8/1994 | Hanaoka | 369/275.4 |
| 5,347,510 A | * | 9/1994 | Hirokane et al. | 369/275.4 |
| 5,430,706 A | * | 7/1995 | Utsunomiya et al. | 369/275.4 |
| 5,976,657 A | * | 11/1999 | Min et al. | 369/275.1 |
| 6,212,158 B1 | * | 4/2001 | Ha et al. | 369/275.4 |
| 6,501,728 B2 | * | 12/2002 | Koizumi et al. | 369/275.4 |

FOREIGN PATENT DOCUMENTS

| | | | | |
|---|---|---|---|---|
| JP | 56071805 A | * | 6/1981 | G11B/3/72 |
| JP | 02078038 A | * | 3/1990 | G11B/7/24 |

OTHER PUBLICATIONS

Morita et al. "Deep Groove Method on High Density Optical Disk Memory", Optomechatronics R&D Department, Nikon Corporation, Yokohama, Japan., Apr. 7–9, 1997.*

Satoh et al. "Key Technology for High Density Rewritable DVD (DVD–RAM)", IEEE Transactions on Magnetics, vol. 34., No. 2., Mar. 1998. pp. 337–342.*

* cited by examiner

*Primary Examiner*—William Korzuch
*Assistant Examiner*—C R Beacham
(74) *Attorney, Agent, or Firm*—Sonnenschein, Nath & Rosenthal LLP

(57) ABSTRACT

According to the present invention, when a land-groove recording method is adopted, thermal crosstalk between a land and an adjoining groove is suppressed effectively. Inhomogeneity of a recording layer between the land and groove is suppressed effectively. A substrate for optical recording media comprises groove-like concave parts (2) and convex parts each created between adjoining concave parts. A border sidewall (4) between a concave part and an adjoining convex part (2) has a plurality of sidewall planes, that is, at least a first sidewall plane (41) that leads to the bed of the concave part and a second sidewall plane (42) that leads to the apical plane of the convex part. The first sidewall plane meets the bed of the concave part at an angle ranging from 120° to less than 180°. The second sidewall plane meets the bed of the concave part at an angle ranging from 90° to 110°. A discontinuous part (6) is produced at least along a borderline between the first sidewall plane and second sidewall plane. The presence of the discontinuous part (6) is effective in minimizing thermal crosstalk between the concave part (2) and convex part (3) and suppressing inhomogeneity of a recording layer between a land and an adjoining groove.

24 Claims, 4 Drawing Sheets

Power of Laser Light Used for Recording (mW)

SUBSTRATE FOR OPTICAL RECORDING MEDIA, OPTICAL RECORDING MEDIUM, MANUFACTURING PROCESS FOR OPTICAL RECORDING MEDIA, AND OPTICAL RECORDING/REPRODUCING METHOD

RELATED APPLICATION DATA

The present application claims priority to Japanese Application No. P11-367464 filed Dec. 24, 1999, which application is incorporated herein by reference to the extent permitted by law.

BACKGROUND OF THE INVENTION

1. Field of the Invention

The present invention relates to a substrate for optical recording media of a so-called land-groove recording type, an optical recording medium, a manufacturing process for optical recording media, and an optical recording/reproducing method. More particularly, this invention is intended to minimize thermal crosstalk between adjoining tracks, that is, between a land and an adjoining groove, minimize a noise, and thus improve a recording density.

2. Description of the Related Art

With the recent trend to digitization of information, there is an increasing demand for media in which a large amount of digital data can be recorded. Media capable of meeting the demand include a so-called phase change optical recording medium, for example, a phase change optical disk, and a magnetooptical disk. The phase change optical recording medium has crystallinity thereof thermally changed to change the optical characteristic thereof, whereby recording is achieved. The magnetooptical disk has a magnetooptical effect thereof changed with application of heat and a magnetic field.

In general, the phase change optical disk or magnetooptical disk has, as seen from a schematic sectional view of FIG. 9 showing a major portion of the disk, a recording layer 5 formed over a substrate 11 for optical recording media with a transparent dielectric layer 51 between them. The substrate 11 transmits light. The transparent dielectric layer 51 is made of, for example, SiN or $ZnS-SiO_2$. The recording layer 5 is a magnetooptical recording layer or a phase change recording layer and so on.

The phase change optical disk is such that changes in reflectance for predetermined light are detected in order to reproduce a recorded information signal. The magnetooptical disk is such that changes in polarization of predetermined light are detected in order to reproduce an information signal.

In these optical disks, guide grooves, that is, groove-like concave parts 2 that are generally referred to as grooves are formed spirally or concentrically on the surface of a substrate of each disk. The concave parts 2 are used to route a laser beam, which is emitted from an optical pickup of a recording/reproducing apparatus, along a train of information areas, or in other words, to produce a tracking servo signal.

For achieving high-density recording, a so-called land-groove recording method is adopted in order to record an information signal both in a groove or in a convex part 3 between the adjoining grooves, or a so-called land.

A technique for recording an information signal in the phase change optical disk or magnetooptical disk is a so-called thermal recording method in which laser light is converged in order to raise the temperature of the recording layer.

In this case, the foregoing land-groove recording method is adopted for attaining a larger recording density. In addition, a cycle of creating a groove, that is, a pitch between a concave part and an adjoining convex part must be minimized.

However, when the cycle of creating a groove is shortened, recording or reproducing becomes more susceptible to thermal interference such as thermal crosstalk, cross-writing, or cross-erasure occurring between adjoining tracks, that is, a groove and an adjoining land. Consequently, a record signal may be undesirably erased or vanished, and a reproduced signal may be deteriorated or faded away. This hinders realization of a high recording density.

For overcoming the above disadvantage, Japanese laid-open patent publication No. 11-25534 has disclosed a magnetooptical disk.

The magnetooptical disk is structured so that a border wall between a groove and a land is an inclined plane and has a width of 160 nm or more. Owing to this structure, a substantial distance between the groove and land is increased in order to minimize the thermal crosstalk.

The modulation degree of a push-pull signal is maximized when the difference D in height between a land and groove is approximately $(2m-1)\lambda/(8n)$ (where m denotes a natural number that is 1, 2, 3, etc.). Herein, $\lambda$ denotes the wavelength of laser light used for reproduction, and n denotes the refractive index of a disk substrate. In general, for attaining a sufficiently large modulation degree of a push-pull signal together with a large difference in height D, the condition of $(2m-1)\lambda/(8n)<D<(2m-1)\lambda/(5.5n)$ should be satisfied.

The critical frequency of a record signal detectable from an optical disk is proportional to $\lambda/NA$ where $\lambda$ denotes the wavelength of laser light and NA denotes the numerical aperture of an objective lens. For attaining a larger recording density, the wavelength of laser light should be reduced and the numerical aperture NA of the objective lens should be increased.

In recent years, the wavelength of laser light emanating from a solid-state laser is converted by using a second harmonic generation element (SHG) and the light source whose wavelength $\lambda$ falls below 415 nm have been obtained. Furthermore, owing to an advancement of semiconductor laser technologies, the semiconductor laser can produce laser light whose wavelength is about 407 nm.

For example, assume that the wavelength of laser light is 407 nm and the refractive index n of a substrate is 1.55. In this case, for maximizing the modulation degree of a push-pull signal used to extend tracking servo control, the difference in height D between a land (convex part) and an adjoining groove (concave part) should be set to approximately 33 nm, 99 nm, 164 nm, or the like under the aforesaid condition. However, a more intense effect of suppressing thermal crosstalk is required to attain a high recording density. The difference in height D must therefore be set to the largest possible value.

However, when the difference in height D between a land and an adjoining groove is too large, it becomes hard to trace the surface shape of the substrate 11 because of the thicknesses of a transparent dielectric layer 51 and a recording layer 5 formed on the substrate. Assuming that the transparent dielectric layer and recording layer are formed on the substrate through sputtering, a layer is deposited even on a sidewall linking a concave part and an adjoining convex part. This diminishes the width of the concave part. Besides, the deposition of the layer on the sidewall diminishes the number of sputtered particles reaching the concave part. Consequently, a layer formed in the concave part becomes thinner.

The heat capacity of the recording layer differs between a concave part and an adjoining convex part. This leads to a difference in sensitivity between a groove and an adjoining land and causes inhomogeneity of an optical disk.

SUMMARY OF THE INVENTION

An object of the present invention is to provide a substrate for optical recording media, an optical recording medium, a manufacturing process for optical recording media, and an optical recording/reproducing method. Herein, a so-called land-groove recording method in which data is recorded in both a land and an adjoining groove is adopted in an effort to improve a recording density. Thermal crosstalk between the land and adjoining groove can be suppressed effectively. Moreover, inhomogeneity of an optical recording medium between the land and adjoining groove can be suppressed effectively.

According to the present invention, what is referred to as the optical recording/reproducing method includes a method of performing at least one of optical recording and optical reproducing.

Accordingly, the present invention is concerned with land-groove recording.

According to the present invention, a substrate for optical recording media has groove-like concave parts created on at least one surface thereof, and has convex parts each created between adjoining concave parts. A border sidewall linking a concave part and an adjoining convex part has at least a first sidewall plane adjoining the bed of the concave part and a second sidewall plane leading to the apical surface of the convex part.

The first sidewall plane meets the bed of the concave part at an angle $\theta_1$ ranging from 120° to less than 180°. The second sidewall plane meets the bed of the concave part at an angle θ2 ranging from 90° to 110°.

Moreover, according to the present invention, in a substrate for optical recording media, a border sidewall linking a concave part and an adjoining convex part has at least a third sidewall plane and a fourth sidewall plane. The third sidewall plane adjoins the bed of the concave part. The fourth sidewall plane leads to the convex part while adjoining the first sidewall plane with an intermediate plane between them. The third and fourth sidewall planes meet the bed of the concave part at angles $\theta_3$ and $\theta_4$ ranging from 90° to 150°. The intermediate plane and the fourth sidewall plane meet at an angle $\theta_5$ ranging from 90° to 150°.

Moreover, according to the present invention, an optical recording medium is structured so that a recording layer will be formed over a surface of the foregoing substrate for optical recording media in accordance with the present invention on which the concave and convex parts are created.

In particular, in an effort to further improve a recording density in the recording layer, record information is preferably recorded in the form of magnetic domains and the reproduction of the information is preferably carried out by at least one of expansion of the magnetic domains and shrinkaze thereof based on temperature distribution derived from irradiation of light.

Moreover, according to the present invention, a manufacturing process for optical recording media is characterized in that a discontinuous part of a recording layer is produced to extend in the depth direction of the concave part and transverse the border sidewall.

Moreover, according to the present invention, an optical recording/reproducing method is such that an optical recording medium having the foregoing structure is employed, and recording and/or reproducing, or in other words, at least one of recording and reproducing is performed on the optical recording medium through irradiation of light. The light to be irradiated is laser light whose wavelength ranges from 330 nm to about 660 nm.

Assume that an optical recording medium is made using the aforesaid substrate for optical recording media in accordance with the present invention. In this case, even if a recording layer, that is, an optical recording layer, to which light is irradiated for the purpose of recording and/or reproducing, is formed on the substrate, thermal crosstalk is effectively suppressed.

This is presumably attributable to the fact that the recording layer is formed to have discontinuous parts produced on both edges of each groove, that is, at a borderline between a groove and an adjoining land. In the discontinuous part, the heat conductivity of the recording layer deteriorates because of a change in the physical property or thickness thereof.

DETAILED DESCRIPTION OF THE PREFERRED EMBODIMENTS

Figure 1:
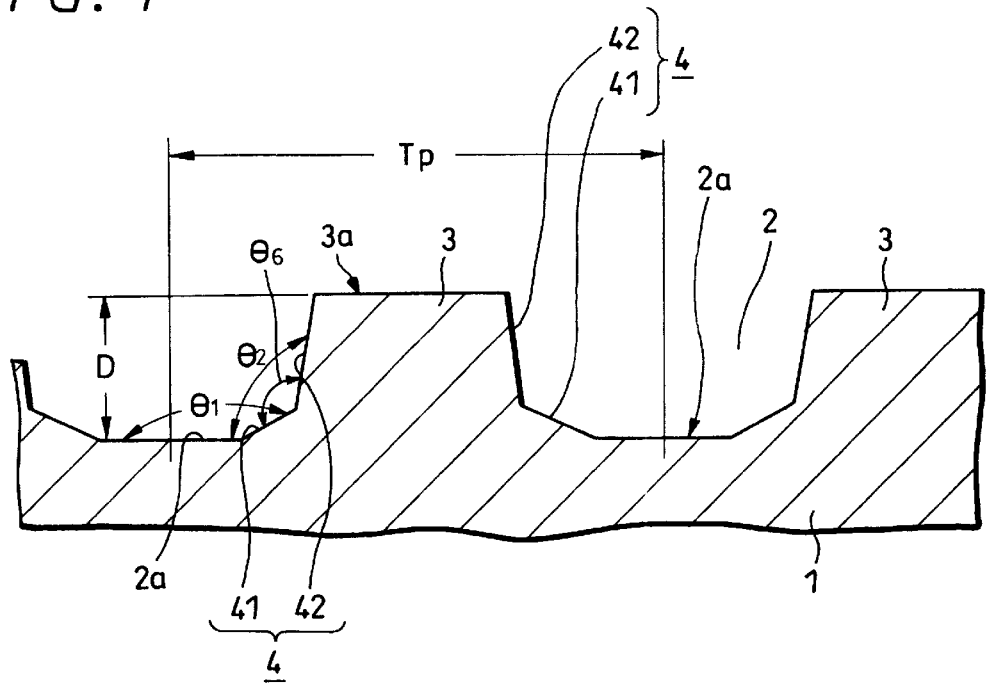
FIG. 1 is a schematic sectional view of a major portion of an example of a substrate for optical recording media in accordance with the present invention.

FIG. 1 is a schematic sectional view of a major portion of an embodiment. As shown in FIG. 1, a substrate 1 for optical recording media in accordance with the present invention is, for example, a disk-shaped substrate made of, for example, polycarbonate (PC) that transmits light or glass. Groove-like concave parts (grooves) 2 are created spirally or concentrically on at least one of the surfaces of the substrate 1. Moreover, convex parts (lands) 3 are created so that each convex part is located between adjoining concave parts 2.

A border sidewall 4 linking a concave part 2 and an adjoining convex part 3 consists of a plurality of sidewall planes, that is, at least a first sidewall plane 41 and a second sidewall plane 42. The first sidewall plane 41 communicates with the bed 2a of the concave part 2. The second sidewall plane 42 communicates with an apical plane 3a of the convex part 3.

The bed 2a and apical plane 3a are planes parallel to the face of the substrate 1 and parallel to each other. An angle $\theta_1$ at which the first sidewall plane 41 meets the bed 2a of the concave part 2 ranges from 120° to less than 180°. An angle $\theta_2$ at which the second sidewall plane 42 meets the bed 2a of the concave part 2 ranges from 90° to 110°.

Figure 2:
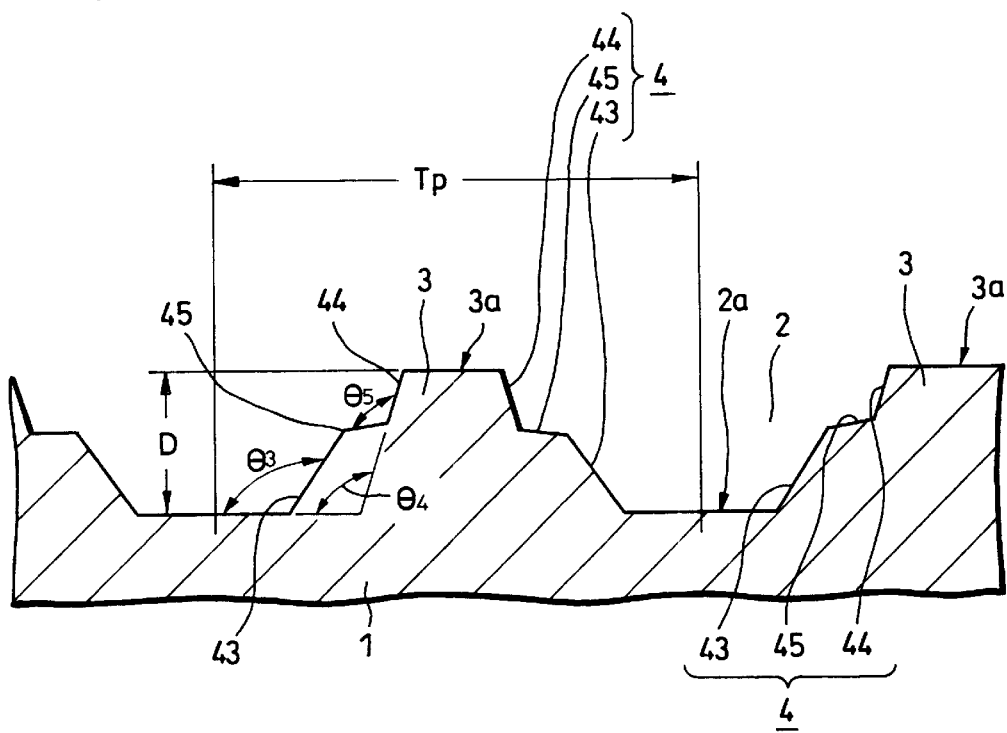
FIG. 2 is a schematic sectional view of a major portion of another example of the substrate for optical recording media in accordance with the present invention.

FIG. 2 is a schematic sectional view of a major portion of another substrate for optical recording media in accordance with another embodiment of the present invention. Similarly to the foregoing substrate, concave parts 2 and convex parts 3 are created. Each border sidewall 4 linking a concave part and an adjoining convex part consists of a third sidewall plane 43 communicating with the bed 2a of the concave part 2, and a fourth sidewall plane 44 communicating with the convex part 3 and adjoining the third sidewall plane 43 with an intermediate plane 45 between them.

In this case, angles $\theta_3$ and $\theta_4$ at which the third and fourth sidewall planes 43 and 44 meet the bed 2a of the concave part 2 range from 90° to 150°.

Moreover, an angle $\theta_5$ at which the fourth sidewall plane 44 meets the intermediate plane 45 ranges 90° to 150°.

The border sidewalls 4 opposed to each other with the concave part 2 between them may be symmetrical relative to the center plane of the concave part 2, or may be asymmetrical as shown in FIG. 1 and FIG. 2.

In the foregoing structures, a difference in height D between the bed 2a of the concave part 2 and the apical plane 3a of the convex part 3 ranges from 80 nm to 230 nm.

Moreover, a distance between the centers of adjoining concave parts 2, that is, a cycle of creating the concave part 2, Tp, is 1.3 µm or less.

Adopted as light to be irradiated for recording and/or reproducing is, for example, laser light whose wavelength ranges from 330 nm to 660 nm.

Figure 3:
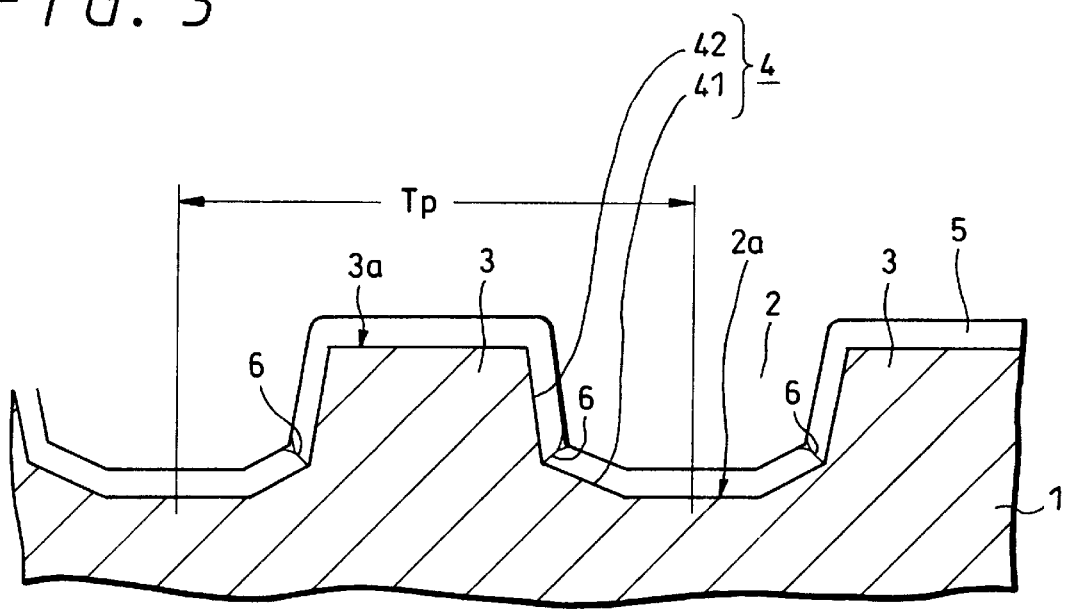
FIG. 3 is a schematic sectional view of a major portion of an example of an optical recording medium in accordance with the present invention.
Figure 4:
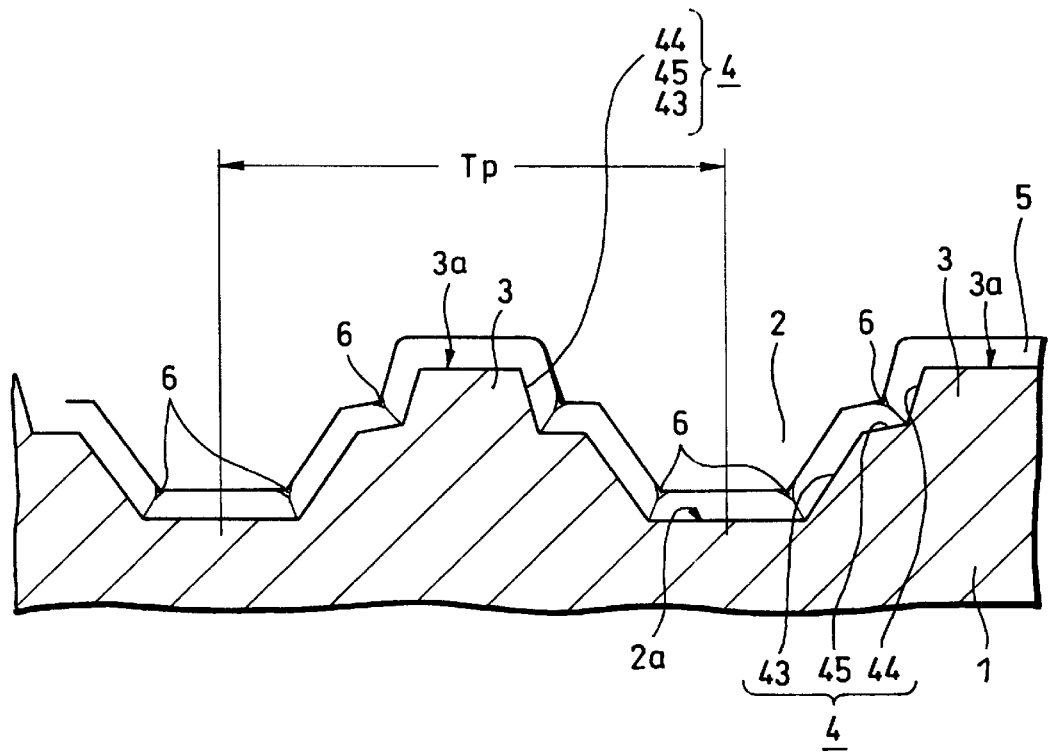
FIG. 4 is a schematic sectional view of a major portion of another example of an optical recording medium in accordance with the present invention.

An optical recording medium in accordance with the present invention has, as shown in the schematic sectional views of FIG. 3 and FIG. 4 showing the major portion of the optical recording medium, a recording layer 5 formed over the surface of the substrate 1 for optical recording media, which has been described in conjunction with FIG. 1 and FIG. 2, on which the concave parts 2 and convex parts 3 are created. The recording layer 5 is formed over the concave parts 2 and convex parts 3.

The recording layer 5 is, for example, a rewritable recording layer.

The recording layer 5 may be structured to exert a magnetooptical effect. Specifically, information is recorded in the form of, for example, magnetic domains. Information is then read or reproduced by detecting changes in polarization caused by the recording layer due to the Kerr effect or Farady effect using laser light irradiated for reproduction. This results in a magnetooptical recording medium.

Alternatively, the recording layer 5 may be structured so that at least one of expansion and shrinkage of magnetic domains is performed based on temperature distribution caused by irradiation of laser light for the purpose of reproduction. For example, as disclosed in Japanese laid-open patent publication No. 6-290496, information is read by the domain wall displacement. This results in a magnetooptical recording medium such as a so-called DWDD (Domani Wall Displacement Detection) medium.

Otherwise, the recording layer 5 may be realized with a phase change recording layer. In this case, information is recorded in the form of changes in an optical property of the recording layer derived from phase changes of crystalline or amorphous state caused by heat of irradiated laser light. Information is read by detecting the changes in the optical property using irradiated laser light. This results in a phase change optical recording medium.

The recording layer 5 is not limited to the illustrated single-layer structure. A multilayered structure including two or more layers may be adopted in order to attain a required property.

According to a reproducing method in accordance with the present invention, laser light is irradiated to the recording layer 5 of the optical recording medium from the substrate 1 side or from a position opposite to the substrate 1.

The laser light irradiated for reproduction is laser light whose wavelength ranges from 330 nm to 660 nm.

With irradiation of laser light for reproduction, magnetic domains in the recording layer exerting a magnetooptical effect are detected as changes in polarization.

Otherwise, as far as the foregoing DWDD medium is concerned, magnetic domains are at least expanded or shrunken based on temperature distribution caused by irradiation of laser light. The changes in the areas of the magnetic domains are detected as changes in polarization deriving from the magnetooptic effect.

Otherwise, the phase changes in the recording layer 5 are detected as changes in an optical property, for example, a reflectance or transmittance of a recording area.

In the aforesaid substrate 1 for optical recording media, the difference D in height between the convex part 3 and concave part 2 ranges from 80 nm to 230 nm, and the cycle of creating the concave part 2, Tp, falls below 1.3 µm. This results in a high recording density.

The difference in height D of 80 nm is calculated by assigning 2 to m in the aforesaid expression $(2m-1)\lambda/(8n)$ or by solving $3\lambda/8n$ where n denotes the refractive index of the substrate 1 that is 1.55. Herein, the wavelength of laser light irradiated for reproduction is 330 nm.

Moreover, the difference in height D of 230 nm is calculated by assigning 1 to m in the aforesaid expression $(2m-1)\lambda/(5.5n)$ or by solving $3\lambda/5.5n$ where n denotes the refractive index of the substrate 1 that is 1.55. Herein, the wavelength of laser light irradiated for reproduction is 660 nm.

According to the present invention, it is intended to improve by at least 10% a recording density, that is, a track density of a digital versatile disk (DVD) for which laser light having a wavelength of 650 nm is used. Therefore, the cycle of creating the concave part 2, Tp, is set to 1.3 µm or less. Consequently, the cycle of creating a recording track on a recording medium used for land-groove recording is a half of Tp that is 0.6 µm or less. The track density can be made larger by 10% or more than the track density of the DVD.

Moreover, when the wavelength of laser light is 330 nm or less, a larger amount of light is absorbed by the substrate for optical recording media. When the wavelength thereof is 660 nm or more, it is hard to improve a recording density.

As mentioned above, light to be irradiated for recording and/or reproducing is laser light whose wavelength ranges from 330 nm to 660 nm. The shorter the wavelength is, the higher a recording density is.

A manufacturing method in accordance with the present invention consists of a step of producing the substrate 1 for optical recording media and a step of forming the recording layer 5 over the surface of the substrate 1 having the concave parts 2 and convex parts 3 created thereon. At this time, the recording layer 5 is formed to have the discontinuous part 6 produced to extend in the depth direction of the concave part 2 and traverse the border sidewall 4. Thus, a thermally discontinued plane is formed.

An exemplary embodiment in which the substrate for optical recording media, the optical recording medium, the manufacturing process for optical recording media, and the optical recording/reproducing method are implemented will be described below, though the present invention is not limited to the embodiment.

The concave parts 2 and convex parts 3 of the substrate 1 for optical recording media shown in FIG. 1 and FIG. 2 are created using a technique referred to as a cutting technique or an etching technique or both of them.

For example, a resist is applied to a glass substrate forming the substrate 1 for optical recording media or forming a stamper used to mold the substrate 1. The resist is exposed to, for example, laser light and developed, whereby a resist pattern is produced. In this case, the intensity of light to which the resist is exposed may be selected from among specific values. Two or more patterns having different widths may be produced. Otherwise, two or more resist layers may be accumulated. Thus, a resist pattern having concave parts whose sidewalls each consist of a plurality of sidewall planes may be produced. Consequently, the concave parts of the resist pattern may be adopted as the concave parts 2. Otherwise, the resist pattern may be plated with nickel or the like, and the nickel plate may be peeled off in order to create a stamper or a stamper base. The stamper base is used to produce a stamper, and the stamper is used to mold the substrate 1 for optical recording media.

Otherwise, a resist may be applied to the same glass substrate as the foregoing one in order to produce a single resist layer or multiple resist layers. The resist is then exposed to laser light and developed in order to form a resist pattern. The resist pattern is used as an etching mask. The glass substrate is etched through chemical reaction or selectively etched through physical sputtering, whereby the concave parts 2 are created.

This results in the substrate 1 for optical recording media having the concave parts 2, each of which has a plurality of sidewall planes 41 and 42 as shown in FIG. 1 or FIG. 2, created spirally or concentrically.

The optical recording layer 5 depending on which various optical recording media are realized is formed on the surface of the substrate 1, as shown in FIG. 3 and FIG. 4, on which the concave parts 2 are created and convex parts 3 are each created between adjoining concave parts 2, by performing, for example, sputtering.

Consequently, the discontinuous part 6 whose quality and thickness are different from other parts is produced along or near borderlines. As shown in FIG. 1 and FIG. 2, the borderlines include a borderline between a plane and the bed 2a of the concave part 2 that meet at an angle of $\theta_1$ ranging from 120° to 150° and a borderline between a plane and the bed 2a that meet at an angle of $\theta_3$ ranging from 90° to 150°. Moreover, the discontinuous part 6 is produced to traverse the concave part 2 along the borderline, extend in the depth direction of the concave part 2, border the concave part 2 and the convex part 3, or divide a groove from an adjoining land.

Moreover, the discontinuous part 6 of the recording layer 5 whose quality and thickness are different from other parts is produced along or near borderlines. The borderlines include a borderline between the sidewall plane 41 and sidewall plane 42 shown in FIG. 1 that meet at an internal angle $\theta_6$, and a borderline between the intermediate plane 45 and fourth sidewall plane 44 shown in FIG. 2 that meet at an internal angle $\theta_5$ ranging from 90° to 150°. The discontinuous part 6 is produced to traverse the concave part along the borderline, extend in the depth direction of the concave part 2, border the concave part 2 and the convex part 3, or divide a groove from an adjoining land.

The discontinuous part is produced because sputtered particles anisotropically float and adhere to the substrate 1. Production of the discontinuous part 6 serving as a dividing line depends greatly on an angle at which a sidewall plane meets the bed 2a.

Assume that the cycle of creating the concave part 2, Tp, is 1.3 μm or less and the difference in height D ranges from 80 nm to 230 nm. A generally adopted sputtering apparatus is used to form the recording layer or the like over the substrate for optical recording media that has the concave parts and convex parts. A transmission electron microscope or a scanning electron microscope is used to observe a section of the recording layer. Consequently, it is revealed that the discontinuous part 6 is produced along a borderline between a plane and the bed 2a that meet at an angle $\theta_3$ ranging from 90° to 150°. Herein, the bed 2a is nearly perpendicular to a direction in which sputtered particles float.

It is also revealed that an angle $\theta_2$ at which the sidewall plane 42 meets the bed 2a ranges from 90° to 110°, an internal angle $\theta_6$ at which the sidewall plane 41 meets the sidewall plane 42 is 180° or less. Namely, when an angle $\theta_1$ ranges from 120° to less than 180°, the angle $\theta_6$ ranges from 90° to 170°. The discontinuous part 6 is produced along a borderline between the sidewall plane 41 and sidewall plane 42 that meet at the angle θ6.

The angles $\theta_2$, $\theta_3$, and $\theta_4$ are 90° or more. This is because if they fall below 90°, the sidewall planes 41, 42, and 43 have sections thereof tapered downwards. This becomes an obstacle to dies cutting or formation of the recording layer.

When an angle at which a sidewall plane meets the bed 2a is larger than 150°, the dividing line that is the discontinuous part 6 is not produced.

When the angle $\theta_1$ ranges from 120° to 150°, the discontinuous part 6 is produced along a borderline between the sidewall potion and the bed that meet at the angle $\theta_1$. When the angle $\theta_1$ ranges from 150° to less than 180°, no discontinuous part is produced.

For reliably producing the discontinuous part 6 along the borderline between the intermediate plane 45 and fourth sidewall plane 44 that meet at an angle $\theta_5$ as shown in FIG. 2, the angle $\theta_5$ must range from 90° to 150°.

When the recording layer 5 has the discontinuous parts 6, the heat conductivity of the recording layer rapidly decreases at the discontinuous parts. This is because the heat conductivity of a metallic film is proportional to the electrical conductivity thereof.

Owing to the discontinuous parts 6 of the recording layer 5 that serve as dividing lines, heat generated in the concave part 2 or convex part 3 is prevented from moving to the adjoining convex part 3 or concave part 2. This leads to minimized thermal crosstalk occurring between the convex part and adjoining concave part. Consequently, cross-erasure or cross-vanishing between the concave part 2 and adjoining convex part 3 that are recording areas can be suppressed.

In the optical recording medium shown in FIG. 3 made using the substrate for optical recording media shown in FIG. 1, a plane adjoining the bed 2a of the concave part 2 meets the bed at an angle $\theta_1$ ranging from 120° to less than 180°. When $150°<\theta_1<180°$, the discontinuous part 6 is not produced adjacently to a groove that is a recording area. The discontinuous part 6 is produced along a borderline between a plane near a land and an adjoining plane that meet at an angle $\theta_6$. The aforesaid disadvantages of the conventional structure are overcome. Uniformity in thermal sensitivity between recording areas, that is, a land and an adjoining groove can be attained. An excellent recording/reproducing characteristic can be exerted. Thermal crosstalk between a land and an adjoining groove can be improved.

When $\theta_1$ ranges from 120° to 150°, the discontinuous part 6 is produced along a borderline between planes that meet at the angle $\theta_1$ and along a borderline between planes that meets the angle $\theta_6$. Thermal crosstalk between a land and an adjoining groove can be suppressed more effectively.

In the optical recording medium shown in FIG. 4 made using the substrate for optical recording media shown in FIG. 2, the plurality of discontinuous parts 6 are produced in the border sidewall 4. Consequently, thermal crosstalk between a land and an adjoining groove can be suppressed more effectively.

Figure 9:
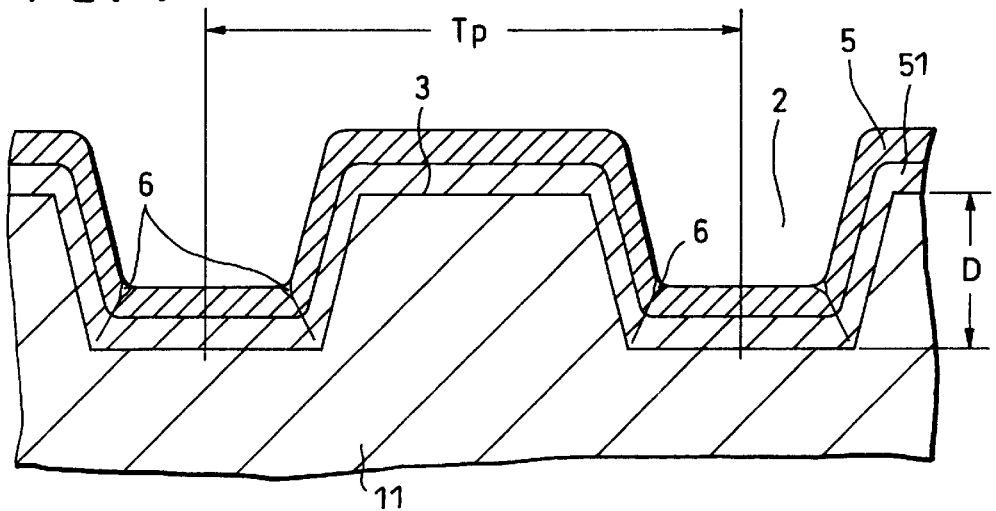
FIG. 9 is a schematic sectional view of a major portion of a conventional optical recording medium.

Even in the conventional structure shown in FIG. 9, the discontinuous part 6 may be produced along a borderline between the bed of the concave part 2 and each of the sidewalls thereof during sputtering to be performed for forming the recording layer 5. However, since the internal angle along the borderline may be set to 150° or more, whether the discontinuous part 6 is produced is uncertain. Moreover, compared with the structure shown in FIG. 3, the discontinuous part 6 is almost produced near the groove. The concave part 2 and adjoining convex part 3 are therefore thermally unbalanced. This leads to non-uniformity in thermal sensitivity.

Furthermore, in the conventional structure, even when the discontinuous part 6 is produced, only one discontinuous part 6 is produced in the border sidewall. The effect of blocking thermal crosstalk between a land and an adjoining groove is therefore low.

As shown in FIG. 1 and FIG. 2, the recording layer 5 may be formed over the substrate 1 for optical recording media in order to realize a magnetic recording medium in which a domain wall displacement detection (DWDD) technique is implemented. According to the DWDD technique, magnetic domains are expanded and/or shrunken based on temperature distribution derived from irradiation of light to detect signals. In this case, reproduction can be achieved more efficiently.

The discontinuity caused by the discontinuous part 6 brings about not only an adiabatic effect but also an effect of magnetic discontinuity for magnetooptical recording media. For example, the aforesaid Japanese laid-open patent publication No. 6-290496 describes that since domain walls are displaced, it is required to demagnetize or magnetically divide the edges of recording areas. The present invention meets the requirement.

Assume that a conventional substrate for optical recording media having concave and convex parts is used to realize a domain wall displacement detection medium. In this case, as mentioned previously, the discontinuity of a recording layer occurs near a groove that is the concave part. This means that a domain wall is displaced properly in the concave part but improperly in the convex part. This is because a continuous magnetic layer is formed from the lower end of the convex part to the top thereof via a border plane. For displacing a domain wall formed in the top of the convex part, a domain wall formed in the border plane communicating with the top must be displaced. The temperature, composition, and coercive force of the magnetic layer formed on the border plane are different from those of the one formed on the bed. For this reason, the domain wall formed in the convex part is hard to be displaced.

In contrast, according to the present invention, the discontinuous part 6 is produced even in the middle of the border plane. Unlike the conventional structure, magnetic discontinuity occurs at a position near the apical plane of the convex part. A domain wall in the convex part is therefore displaced properly during reproduction. Consequently, when the land-groove recording/reproducing method is adopted, recording and reproducing can be achieved efficiently.

In the substrate for optical recording media and the optical recording medium in accordance with the present invention, the discontinuous part 6 is produced in the border sidewall between the concave part 2 and convex part 3, at least in the middle of the concave part 2 and convex part 3. Needless to say, the shape of the border sidewall 4 and the structure of the recording layer are not limited to the aforesaid ones. Various modifications can be made.

For example, the structures shown in FIG. 1 and FIG. 2, that is, the structures shown in FIG. 3 and FIG. 4 may be combined. Namely, the first sidewall plane 41 described in conjunction with FIG. 1 and FIG. 3, that is, a plane that meets the bed 2a at an angle ranging from 120° to less than 180° may be created between the third sidewall plane 43 and the bed 2a of the concave part 2 in the structures shown in FIG. 2 and FIG. 4. This results in a structure having both the constituent features of the present invention shown in FIG. 3 and FIG. 4.

Next, an embodiment in which the substrate for optical recording media, the optical recording medium, the manufacturing process for optical recording media, and the optical recording/reproducing method in accordance with the present invention will be described below.

FIRST EXAMPLE

In the present example, the substrate 1 for optical recording media has the groove-shaped concave parts 2 and convex parts 3 created as shown in FIG. 1. The border sidewall 4 linking the concave part 2 and adjoining convex part 3 has the first and second sidewall planes 41 and 42. The substrate 1 is used to realize a disk-like DWDD medium. In this case, the angle $\theta_1$ is set to 157°, the angle $\theta_2$ is set to 106°, and the difference in height between a concave part and an adjoining convex part is 160 nm.

In this example, the concave parts 2 are created on one surface of the substrate 1 with the cycle of creating the concave part 2 in a radial direction, Tp, set to 0.9 $\mu$m. The transparent dielectric layer 51 that is a silicon nitride layer of 35 nm thick is formed over the surface of the substrate 1, on which the concave parts 2 and convex parts 3 are created, through magnetron sputtering. Moreover, the recording layer 5 that is a magnetooptical recording layer of 100 nm thick, the transparent dielectric layer 52 that is a silicon nitride layer of 10 nm thick, and a reflecting layer 54 that is an aluminum alloy layer of 60 nm thick are deposited successively. The distance of the substrate from a target preserved during sputtering is 160 mm.

Furthermore, an ultraviolet curing resin is applied to the surface in order to form a protective layer 55 of 10 $\mu$m thick according to a rotary application method. The surface is then cured with irradiation of ultraviolet.

The recording layer 5 has a known magnetic switched connection multilayered structure enabling detection of displaced domain walls. The recording layer 5 is composed of a GdFeCoAl layer of 30 nm thick, a TbFeCoAl layer of 15 nm thick, and a TbFeCo layer of 55 nm thick.

The thus formed recording layer 5 has substantially the same width between in the concave part 2 and on the convex part 3.

The optical recording medium having the foregoing structure has the discontinuous part 6 produced therein. The discontinuous part is located at a position in the first sidewall plane 41 opposite to the bed 2a of the concave part 2, that is, away from the bed 2a thereof. The heat capacity or volume of the recording layer observed on the apical plane of the convex part 3 thermally isolated by the discontinuous part 6 is approximately 1.1 times larger than that observed on the bed 2a of the concave part 2.

Laser light whose wavelength is 650 nm is irradiated to the magnetooptical recording medium having the foregoing structure from a position opposite to the recording layer 5 of the substrate 1 for optical recording media. Thus, information is recorded in the concave parts 3 and the convex parts 2 using an optical system including an objective lens whose numerical aperture NA is 0.6 according to a pulse strobe magnetic modulation method. In short, land-groove recording is carried out.

An RLL modulated random signal representing each bit with a wavelength of 0.15 µm is used for recording.

The power of laser light to be irradiated for reproduction is 1.9 mW for the lands and 1.8 mW for the grooves.

The linear velocity of the optical recording medium for laser light used to record and reproduce information is 1.5 m/sec.

Figure 7:
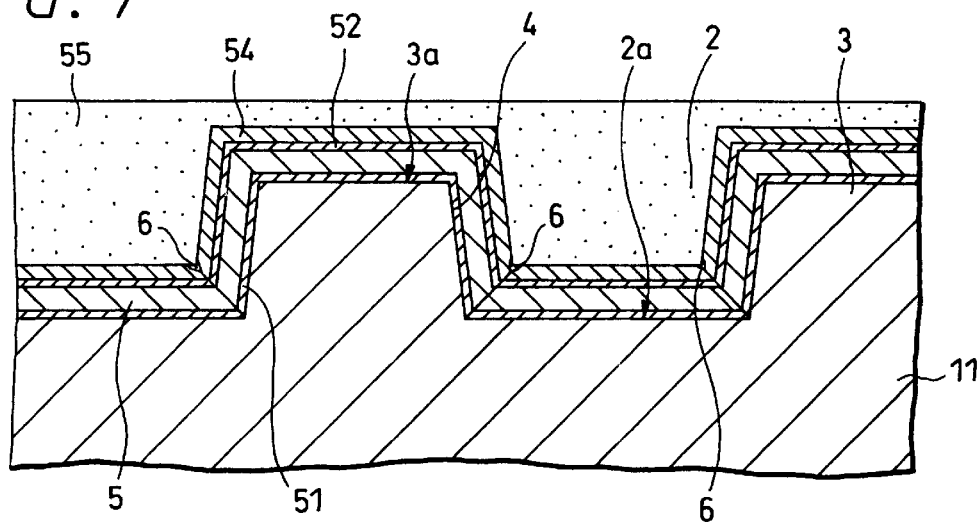
FIG. 7 is a schematic sectional view showing a major portion of an optical recording medium that is an example for comparison.

FIG. 7 shows the dependency of a bit error rate on the power of laser light to be irradiated to record information in the optical recording medium of the first example.

In FIG. 7, a curve 71 indicates a bit error rate observed when information is recorded and reproduced in and from the concave parts or grooves alone according to the aforesaid recording method. A curve 72 indicates the dependency of a bit error rate on the power of laser light observed when information is recorded first in the convex parts or lands alone and thereafter recorded in the grooves adjoining the lands using laser light of the same power, and information is reproduced from the lands.

Assume that the threshold of the bit error rate is $5\times10^{-4}$. As seen from the curve 71, the minimum power of laser light used for recording, that is, the power of laser light used to record information in the grooves alone with the threshold of the bit error rate set to $5\times10^{-4}$ or less is approximately 6.1 mW. As seen from the curve 72, the maximum power of laser light used to record information in the grooves considering the influence to the adjoining lands is approximately 8.2 mW. That is to say, the margin for the power of laser light used to record information in the grooves ranges from approximately 6.1 mW to 8.2 mW, or is ±10.8%.

A curve 73 indicates the dependency of a bit error rate on the power of laser light observed when information is recorded in the lands alone and reproduced from the lands. A curve 74 indicates the dependency of a bit error rate on the power of laser light observed when information is first recorded in the grooves alone and thereafter recorded in the adjoining lands using laser light of the same power, and information is reproduced from the grooves.

As seen from the curves 73 and 74, the margin for the power of laser light used to record information in the lands is substantially identical to that for the power of laser light used to record information in the grooves.

The heat capacitor of the recording layer is substantially the same between a land and an adjoining groove. A difference in the dependency of a bit error rate on the power of laser light used for recording is small between the land and groove. This means that the land and groove are thermally balanced.

FIRST EXAMPLE FOR COMPARISON

Figure 5:
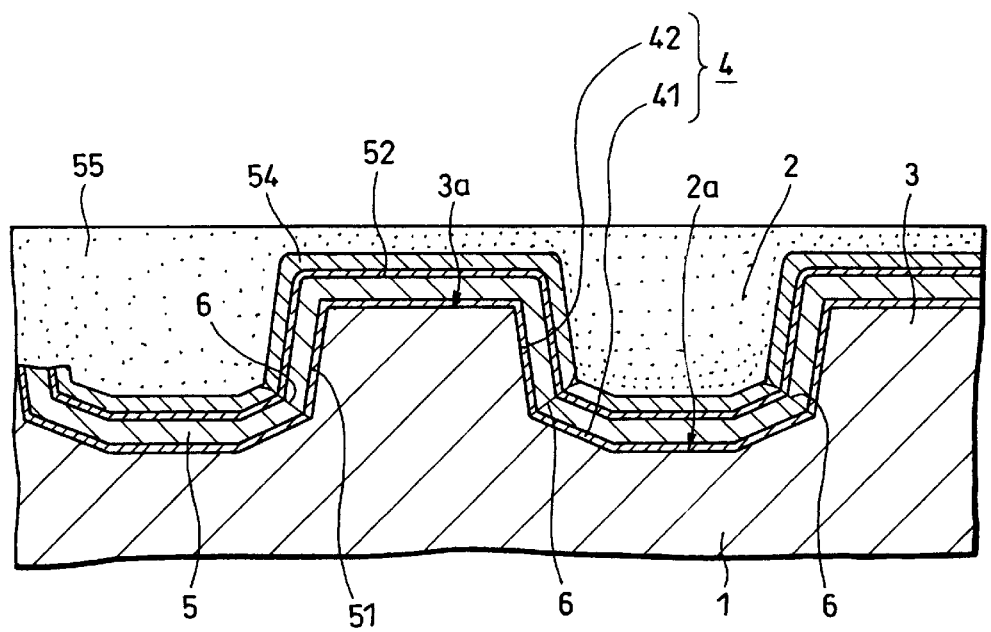
FIG. 5 is a schematic sectional view of a major portion of still another example of an optical recording medium in accordance with the present invention.
Figure 6:
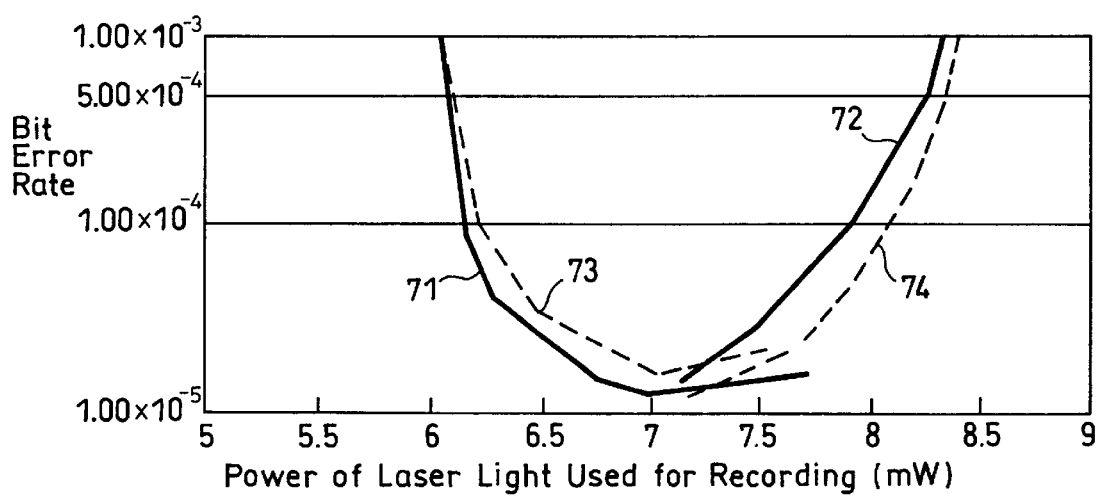
FIG. 6 graphically shows the dependency of a bit error rate on the power of light used to record data in an optical recording medium in accordance with the present invention.

The substrate 11 for optical recording media is, as seen from the schematic sectional view of FIG. 7, analogous to the substrate 11 shown in FIG. 9. The substrate 11 of the present example for comparison is identical to that of the first example except that the border sidewall linking the concave part 2 and convex part 3 has a single sidewall plane. In FIG. 7, the same reference numerals are assigned to members identical to those shown in FIG. 5, and the description of the members will be omitted. Incidentally, an angle at which the sidewall meets the bed is 113°.

Even in the present example for comparison, the width of the concave parts 2 of the recording layer 5 and that of the convex parts 3 thereof are nearly equal to each other.

Even in this case, the discontinuous part 6 serving as a discontinuity of a layer is produced. The heat capacity, that is, volume of the recording layer observed on the apical plane of the convex part 3 is approximately twice as large as the heat capacity, that is, volume of the recording layer observed on the bed 2a of the concave part 2.

Even in this optical recording medium, the same optical system as that employed in the first example is used to record information according to the same method. The power of laser light used to reproduce information is 2.0 mW for the lands and 1.6 mW for the grooves.

Figure 8:
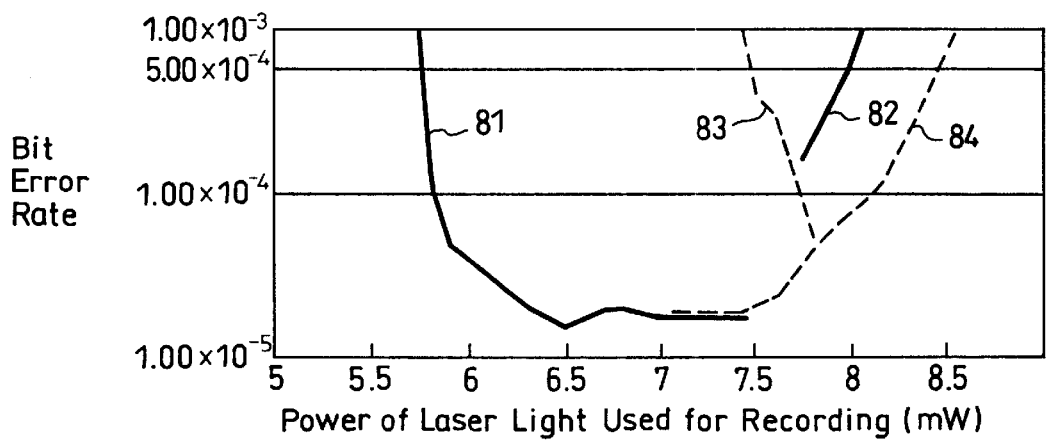
FIG. 8 graphically shows the dependency of a bit error rate on the power of light used to record data in the optical recording medium of the example for comparison.

FIG. 8 shows the dependency of a bit error rate on the power of laser light used to record information on the optical recording medium of the first example for comparison.

In FIG. 8, a curve 81 indicates a bit error rate observed when information is recorded in the concave parts or grooves according to the aforesaid method and reproduced therefrom. A curve 82 indicates the dependency of a bit error rate on the power of laser light observed when information is first recorded in the convex parts or lands and thereafter in the grooves adjoining the lands using laser light of the same power, and information is reproduced from the lands.

Even in this example, assume that the threshold of the bit error rate is set to $5\times10^{-4}$. As seen from the curves 81 and 82, the margin for the power of laser light used to record information in the grooves ranges from approximately 5.7 mW to 8.0 mW, that is, is ±16.8%.

A curve 83 indicates the dependency of a bit error rate on the power of laser light used to record and reproduce information in and from the lands. A curve 84 indicates the dependency of a bit error rate on the power of laser light observed when information is first recorded in the grooves alone and thereafter recorded in the adjoining lands using laser light of the same power, and information is reproduced from the grooves.

As seen from the curves 83 and 84, the margin for the power of laser light used to record or reproduce information in or from the lands ranges from 7.5 mW to 8.4 mW, that is, is ±5.7%.

As mentioned above, in the example for comparison, the margin for the power of laser light used to record information in the grooves is ±16.8%, and the margin for the power of laser light used to record information in the lands is ±5.7%. The margin for the power of laser light used to record information in the lands is much smaller than that for the power of laser light used to record information in the grooves.

Compared with the first example in which the present invention is implemented, in the example for comparison, there is a large difference between the margin for the power of laser light used to record information in the grooves and the margin for the power of laser light used to record information in the lands. In the example for comparison, since the lands are thermally isolated from the grooves, the heat capacity of the recording layer is small in the grooves but large in the lands. In other words, since a small amount of heat is used to raise the temperature of the recording layer to a temperature required to record information in the grooves. Information is therefore recorded in the grooves using laser light of a small power. In contrast, a large amount of heat is needed to raise the temperature thereof for the purpose of recording information in the lands, and the large power of laser light is therefore needed.

The power of laser light required to record information in a groove and cross-write in an adjoining land must be large enough to raise the temperature of the recording layer on the land itself whose heat capacity is large, and still larger power is needed. In contrast, the power of laser light required to record information in a land and cross-write in an adjoining groove may be small as long as the temperature of the recording layer in the groove itself whose heat capacity is small can be raised, and a little more recording power is needed.

In the structure of the example for comparison, the discontinuous part is produced on the edges of a groove. This results in a large difference in the heat capacity of the recording layer between a land and an adjoining groove.

In contrast, according to the present invention, the border sidewall is composed of at least the first and second sidewall planes 41 and 42. The discontinuous part 6 is located away from a groove. Consequently, the heat capacity of the recording layer is uniform between a land and an adjoining groove.

As apparent from the description, when the optical recording medium in accordance with the present invention is constructed using the substrate for optical recording media in accordance with the present invention in order to perform recording and reproduction, compared with the example for comparison having the conventional structure, the heat capacity of the recording layer becomes uniform between a land and an adjoining groove. Moreover, a difference in the dependency on the power of laser light can be minimized. This results in an optical recording medium in which a land and an adjoining groove are thermally balanced.

The foregoing example is concerned with a DWDD optical recording medium adaptable to a domain wall displacement detection reproducing method. Needless to say, the present invention can be adaptable to an optical recording medium and a substrate for the optical recording medium for a polarization detection-based reproducing method and a phase change type, or any other recording media and substrates for various recording/reproducing methods.

In the foregoing example, the border sidewall is composed of two sidewall planes. Alternatively, the border sidewall may be composed of a plurality of sidewall planes.

Moreover, light is irradiated to an optical recording medium for the purpose of recording and/or reproducing. At this time, light may be irradiated to the recording layer from the back of the substrate 1 or from the face of the recording medium opposite to the substrate 1. When light is irradiated from the face of the optical recording medium opposite to the substrate 1, the substrate 1 for optical recording media may or may not be transparent to the irradiated light. Moreover, the reflecting layer 54 is formed on the substrate 1.

As described so far, according to the present invention, the discontinuous part 6 is produced in a border sidewall linking a land and an adjoining groove formed on a substrate for optical recording media. Thermal crosstalk between the land and adjoining groove can be suppressed effectively. Moreover, the border sidewall is composed of a plurality of sidewall planes. The discontinuous part is produced along a borderline between sidewall planes. The thermal crosstalk can be suppressed efficiently.

Moreover, according to the present invention, in a substrate for optical recording media and in an optical recording medium, a border sidewall linking a land and an adjoining groove is composed of a plurality of sidewall planes. A discontinuous part of a recording layer can be produced near each land. Consequently, a land and an adjoining groove can be thermally balanced. The power margin required for recording or reproducing can be made uniform between the land and adjoining groove.

Since the discontinuous part 6 is produced, a domain wall produced in a land of, for example, a DWDD medium can be displaced properly.

Light whose wavelength ranges from 330 nm to 660 nm is used to record or reproduce an information signal in or from an optical recording medium in accordance with the present invention, or an optical recording medium formed on a substrate for optical recording media in accordance with the present invention, or desirably, a DWDD medium. While thermal crosstalk is suppressed effectively, a land and an adjoining groove can be thermally balanced. Moreover, the optical recording medium can offer a large recording capacity.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A substrate for optical recording media comprising:

groove-like concave parts; and convex parts each created between said adjoining concave parts, wherein a border sidewall linking said concave part and said adjoining convex part has at least a first sidewall plane that adjoins the bed of said concave part, and a second sidewall plane leading to the apical plane of the convex part relatively to said first sidewall plane; and an angle $\theta_1$ at which said first sidewall plane meets the bed of the concave part ranges from 120° to less than 180°, and an angle $\theta_2$ at which said second sidewall plane meets the bed of the concave part ranges from 90° to 110°.

2. A substrate for optical recording media comprising:

groove-like concave parts; and convex parts each created between said adjoining concave parts, where a sidewall linking said concave part and said adjoining convex part has at least a third sidewall plane that leads to the bed of said concave part and a fourth sidewall plane that leads to said convex part and adjoins said third sidewall plane with an intermediate plane between them; and angles $\theta_3$ and $\theta_4$ at which said third and fourth sidewall planes meet the bed of the concave part range from 90° to 150°; and an angle $\theta_5$ at which said intermediate plane meets said fourth sidewall plane ranges 90° to 150°.

3. The substrate for optical recording media according to claim 1, wherein a difference in height between the bed of said concave part and the apical plane of said convex part ranges 80 nm to 230 nm.

4. The substrate for optical recording media according to claim 2, wherein a difference in height between the bed of said concave part and the apical plane of said convex part ranges 80 nm to 230 nm.

5. The substrate for optical recording media according to claim 1, wherein a distance Tp between the center of the concave part and that of an adjoining concave part is 1.3 μm or less.

6. The substrate for optical recording media according to claim 2, wherein a distance Tp between the center of the concave part and that of an adjoining concave part is 1.3 μm or less.

7. An optical recording medium having a substrate for optical recording media, which comprises groove-like concave parts and convex parts each created between adjoining concave parts, in which a border sidewall linking said concave part and said adjoining convex part has at least a first sidewall plane that adjoins the bed of the convex part and a second sidewall plane that leads to the apical plane of the convex part relatively to said first sidewall plane, and in which an angle $\theta_1$ at which said first sidewall plane meets the bed of the concave part ranges from 120° to less than 180°, and an angle $\theta_2$ at which said second sidewall plane meets the bed of the concave part ranges from 90° to 110°, wherein a recording layer is formed over a surface of said substrate on which the concave parts and convex parts are created.

8. An optical recording medium having a substrate for optical recording media, which comprises groove-like concave parts and convex parts each created between adjoining concave parts, in which a border sidewall linking said concave part and said adjoining convex part has at least a third sidewall plane that leads to the bed of the concave part and a fourth sidewall plane that leads to the convex part and adjoins said third sidewall plane with an intermediate plane between them, and in which angles $\theta_3$ and $\theta_4$ at which said third and fourth sidewall planes meet the bed of the concave part range from 90° to 150°, and an angle $\theta_5$ at which said intermediate plane meets said fourth sidewall plane ranges from 90° to 150°, wherein a recording layer is formed over a surface of said substrate on which the concave parts and convex parts are created.

9. The optical recording medium according to claim 7, wherein a discontinuous part of said recording layer is produced to extend in the depth direction of the concave part and traverse said border sidewall.

10. The optical recording medium according to claim 8, wherein a discontinuous part of said recording layer is produced to extend in the depth direction of the concave part and traverse said border sidewall.

11. The optical recording medium according to claim 7, wherein a difference in height between the bed of the concave part and the apical plane of the convex part ranges from 80 nm to 230 nm.

12. The optical recording medium according to claim 8, wherein a difference in height between the bed of the concave part and the apical plane of the convex part ranges from 80 nm to 230 nm.

13. The optical recording medium according to claim 7, wherein the distance Tp between the center of the convex part and that of an adjoining convex part is 1.3 μm or less.

14. The optical recording medium according to claim 8, wherein the distance Tp between the center of the convex part and that of an adjoining convex part is 1.3 μm or less.

15. The optical recording medium according to claim 7, wherein information is recorded in said recording layer in the form of magnetic domains, and said information is reproduced through at least one of expansion of the magnetic domains and shrinkage thereof based on temperature distribution derived from irradiation of light.

16. The optical recording medium according to claim 8, wherein information is recorded in said recording layer in the form of magnetic domains, and said information is reproduced through at least one of expansion of the magnetic domains and shrinkage thereof based on temperature distribution derived from irradiation of light.

17. A manufacturing process for optical recording media comprising:

a step of producing a substrate for optical recording media so that the substrate will comprise groove-like concave parts and convex parts each created between adjoining concave parts, a border sidewall linking said concave part and said adjoining convex part will have at least a first sidewall plane that adjoins the bed of the concave part and a second sidewall plane that leads to the apical plane of the convex part relatively to said first sidewall plane, an angle $\theta_1$ at which said first sidewall plane meets the bed of the concave part will range from 120° to less than 180°, and an angle $\theta_2$ at which said second sidewall plane meets the bed of the concave part will range from 90° to 110°; and a step of forming a recording layer over a surface of said substrate on which the concave parts and convex parts are created, wherein when said recording layer is formed, at least one discontinuous part is produced to extend in the depth direction of the concave part and transverse said border sidewall.

18. A manufacturing process for optical recording media comprising:

a step of producing a substrate for optical recording media so that the substrate will comprise groove-like concave parts and convex parts each created between adjoining concave parts, a border sidewall linking said concave part and said adjoining convex part will have at least a third sidewall plane that leads to the bed of the concave part and a fourth sidewall plane that leads to the convex part and adjoins said third sidewall plane with an intermediate plane between them, angles $\theta_3$ and $\theta_4$ at which said third and fourth sidewall planes meet the bed of the concave part will range from 90° to 150°, and an angle $\theta_5$ at which said intermediate plane meets said fourth sidewall plane will range from 90° to 150°; and a step of forming a recording layer over a surface of said substrate on which the concave parts and convex parts are created, wherein when said recording layer is formed, at least two discontinuous parts are produced to extend in the depth direction of the concave part and transverse said border sidewall.

19. An optical recording/reproducing method wherein:

a substrate for optical recording media comprises groove-like concave parts and convex parts each created between adjoining concave parts, a border sidewall between said concave part and said adjoining convex part having at least a first sidewall plane that adjoins the bed of the concave part and a second sidewall plane that leads to the apical plane of the convex part relatively to said first sidewall plane, an angle $\theta_1$ at which said first sidewall plane meets the bed of the concave part ranging from 120° to less than 180°, an angle $\theta_2$ at which said second sidewall plane meets the bed of the concave part ranging from 90° to 110°;

an optical recording medium has a recording layer formed over a surface of said substrate on which the concave parts and convex parts are created, and has at least one discontinuous part of said recording layer produced to extend in the depth direction of the concave part and transverse said border sidewall; and recording and reproducing are performed on both the concave parts and convex parts of said optical recording medium.

20. An optical recording/reproducing method wherein:

a substrate for optical recording media comprises groove-like concave parts and convex parts each created between adjoining concave parts, a border sidewall between said concave part and said adjoining convex part having at least a third sidewall plane that leads to the bed of the concave part and a fourth sidewall plane that leads to the convex part and adjoins said third sidewall plane with an intermediate plane between them, angles $\theta_1$ and $\theta_2$ at which said third and fourth sidewall planes meet the bed of the concave part ranging from 90° to 150°, an angle $\theta_5$ at which said intermediate plane meets said fourth sidewall plane ranging from 90° to 150°;

an optical recording medium has a recording layer formed over a surface of said substrate on which the concave parts and convex parts are created, and has at least two discontinuous parts of said recording layer produced to extend in the depth direction of the concave part and transverse said border sidewall; and recording and reproducing are performed on both the concave parts and convex parts of said optical recording medium.

21. The optical recording/reproducing method according to claim 19, wherein light whose wavelength ranges from 330 nm to 660 nm is irradiated for at least one of recording and reproducing.

22. The optical recording/reproducing method according to claim 20, wherein light whose wavelength ranges from 330 nm to 660 nm is irradiated for at least one of recording and reproducing.

23. The optical recording/reproducing method according to claim 19, wherein information is recorded in said recording layer in the form of magnetic domains, and information is reproduced through at least one of expansion of the magnetic domains and shrinkage thereof based on temperature distribution derived from irradiation of light.

24. The optical recording/reproducing method according to claim 20, wherein information is recorded in said recording layer in the form of magnetic domains, and information is reproduced through at least one of expansion of the magnetic domains and shrinkage thereof based on temperature distribution derived from irradiation of light.

* * * * *